(12) United States Patent
Emard et al.

(10) Patent No.: US 8,490,021 B2
(45) Date of Patent: Jul. 16, 2013

(54) USER INTERFACE FOR NAVIGATING LARGE SCALE HIERARCHICAL NAMESPACES

(75) Inventors: Michael Emard, Seattle, WA (US); Nigel Wolters, Sammamish, WA (US); Kenik Hassel, Sammamish, WA (US); Ian Lucas, Seattle, WA (US); Manal Mohanna, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1132 days.

(21) Appl. No.: 12/143,370

(22) Filed: Jun. 20, 2008

(65) Prior Publication Data

US 2009/0319956 A1 Dec. 24, 2009

(51) Int. Cl.
*G06F 3/048* (2006.01)

(52) U.S. Cl.
USPC ........... 715/853; 715/751; 715/738; 715/851; 715/854

(58) Field of Classification Search
USPC .......................... 715/751, 738, 851, 853, 854
See application file for complete search history.

(56) References Cited

U.S. PATENT DOCUMENTS

| 6,128,016 | A | 10/2000 | Coelho et al. |
| 6,247,020 | B1 * | 6/2001 | Minard ................................ 1/1 |
| 6,248,020 | B1 * | 6/2001 | Morath et al. .................. 470/57 |
| 6,393,427 | B1 | 5/2002 | Vu et al. |
| 6,948,125 | B2 | 9/2005 | Detweiler et al. |
| 6,961,909 | B2 | 11/2005 | Lord et al. |
| 7,242,413 | B2 | 7/2007 | Chu et al. |
| 7,334,196 | B2 | 2/2008 | Suppan et al. |
| 7,343,568 | B2 | 3/2008 | Jiang et al. |
| 7,530,029 | B2 * | 5/2009 | Satterfield et al. ............. 715/779 |
| 7,614,016 | B2 * | 11/2009 | Wong et al. .................... 715/854 |
| 7,694,233 | B1 * | 4/2010 | Ording .......................... 715/790 |
| 7,818,672 | B2 * | 10/2010 | McCormack et al. ........ 715/715 |
| 2006/0107218 | A1 | 5/2006 | Clark et al. |
| 2007/0240052 | A1 | 10/2007 | Sherrill et al. |
| 2007/0265930 | A1 * | 11/2007 | Mohr .............................. 705/26 |

OTHER PUBLICATIONS

"Proposal for AFS Windows Shell Namespace Extension", retrieved: Apr. 11, 2008, 16 pages.
Song, et al., "LensTree: Browsing and Navigating Large Hierarchical Information Structures", 2006, 6 pages.
"Eddt", Released on Feb. 9, 2006, 2 pages.

* cited by examiner

*Primary Examiner* — Omar Abdul-Ali
*Assistant Examiner* — Sherrod Keaton
(74) *Attorney, Agent, or Firm* — Toler Law Group, PC (57) ABSTRACT

A system and method of displaying user interface information with respect to navigation of a hierarchical namespace is disclosed. The hierarchical namespace includes a first set of items representing a top level portion of the hierarchical namespace and a second set of items representing lower levels of the hierarchical namespace.

20 Claims, 5 Drawing Sheets

USER INTERFACE FOR NAVIGATING LARGE SCALE HIERARCHICAL NAMESPACES

TECHNICAL FIELD

The present disclosure relates to a user interface for navigating hierarchical data.

BACKGROUND

Existing user interface approaches for navigating large hierarchical namespaces can be inefficient and difficult to use. When navigating broad namespaces using existing tree control designs, users can quickly lose ancestral context which has scrolled from view. Also, the navigation of deep namespaces using existing user interface approaches can be inefficient.

SUMMARY

A user interface provides a set of controls providing a contextual navigation environment for users dealing with complex namespaces. The user interface combines most recently used links and inline search functionality together with a hierarchical browser mechanism. The user interface provides the most recently used links in conjunction with a simplified display representing a top level of navigation of the hierarchical namespace. The user interface includes an expanded column explorer control mechanism together with a static navigation pane for accessing nodes of a hierarchical data structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
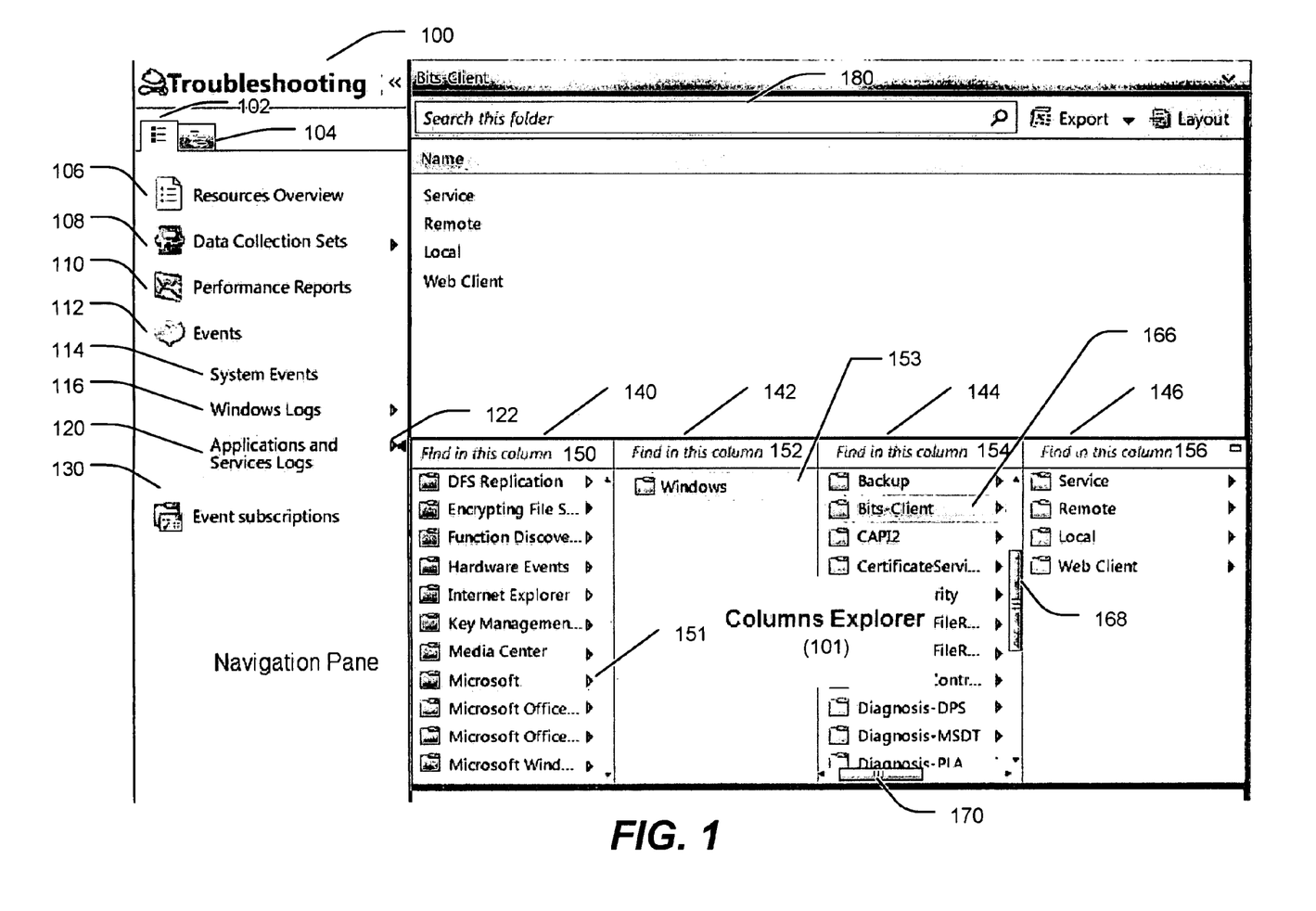
FIG. 1 is a general diagram that illustrates a particular embodiment of a user interface.

Referring to FIG. 1, a particular embodiment of a user interface for navigating a hierarchical namespace data structure is illustrated. The user interface includes a first navigation pane (or panel) 100 and a column explorer display area 101 including a plurality of selectively displayable columns 140, 142, 144, and 146. The column explorer display area 101 is activated by selection of a column explorer activation icon 122. The navigation pane 100 includes a first control item 102 to select a first tree data structure display and a second control item 104 to select a second tree data structure display. Either the first tree data structure display or the second tree data structure display is visible to a user at any particular time. The first tree data structure display presents hierarchical data of a tree data structure with respect to a first orientation and the second tree data structure display presents the hierarchical data of the tree data structure with respect to a second orientation. With the user interface shown in FIG. 1, the first control item 102 is selected such that the first tree data structure display is shown. The first tree data structure display includes the navigation pane 100 and the column explorer display area 101. The navigation pane 100 includes a resources overview selector 106, a data collection selector 108, a performance reports selector 110, an event selector 112, and an event subscriptions selector 130. The event selector 112 includes a plurality of subset icons including a system events icon 114, a Windows® logs icon 116, and an applications and services logs icon 120. The applications and services logs icon 120 is displayed adjacent to the column explorer display area 101 and the column explorer activation icon 122. The user interface also includes a search field 180 where search text may be entered.

Each of the subsets 114, 116, and 120 displayed in the navigation pane 100 under the event selector header 112 represent high level nodes of a hierarchical data structure such as a tree data structure of a hierarchical namespace. Upon selection of any of the high level nodes 116, and 120 (selecting 122), a detailed column showing sub-nodes of the selected node appears and is presented by way of columns within the column explorer display area 101. For example, each of the items within the first column 140 are nodes representative of children nodes of the parent node 120. In a particular embodiment, the navigation pane 100 is a permanent display region and the column explorer display area 101 presents one or more panels or expandable pop-up windows (or regions) that are temporarily visible depending upon user activation and use during navigation. In an alternative embodiment, the column explorer display area 101 presents the one or more panels in a docked mode, where the one or more panels are permanently visible as fixed display regions. Further, in a particular embodiment, the user can selectively display the one or more panels as expandable pop-up regions or fixed display regions by toggling between pop-up mode and docked mode. In addition, a first portion of a hierarchical data structure, such as the high level nodes of a tree data structure, are shown within the navigation pane 100 while a second portion of the hierarchical data structure (such as lower level tree nodes) may be displayed in one or more panels within the column explorer display area 101 of the user interface.

Upon selection of the column explorer activation icon 122, a first column 140 of the column explorer display area 101 is displayed. The first column 140 includes a first column searching field 150 and includes a plurality of selectable items, such as a set of items presented in a list or other display grouping including selectable data items, such as the selectable item 151. Upon user selection of any of the selectable items, such as selectable item 151, a second column 142 is displayed and provides a user with further selections. The second column 142 includes a second column searching field 152 and a representative selectable item 153. The column explorer display area 101 includes multiple columns including a representative third column 144 and a fourth column 146. The third column 144 includes a third column searching field 154 and a representative selectable item 166. The fourth column 146 includes a fourth column searching field 156 and a plurality of selectable items. Each of the columns in the column explorer display area 101 includes a vertical scroll bar, such as vertical scroll bar 168 and horizontal scroll bar 170. In one embodiment, each of the columns in the column explorer display area 101 may expand vertically when the particular column is in focus, in order to display additional selectable items. The column may expand vertically above or below the originally displayed column area. For example, the third column 144 could expand up or down to display additional selectable items, offering a navigation alternative to the vertical scroll bar 168.

When activated for viewing, the user interface display as shown in FIG. 1 presents other portions of the hierarchical data in a set of columns or display panels including a first column 140 which may be a left most column, and upon selection, the user interface display provides display of subsequent columns, such as the second column 142, to reveal further portions of hierarchical data in the tree data structure. Each of the displayable columns within the column explorer display area 101 may be individually searchable using the column searching fields, such as the first column searching field 150. Each column is scrollable in a vertical direction and/or in a horizontal direction as shown. Also, when multiple columns of the column explorer display area 101 are displayed, each displayable column is adjacent to at least one other column and each displayable column represents a group of nodes of the hierarchical data structure that are at a same level, such as a common level of a tree data structure. For example, each of the nodes of a tree data structure at a second level may be displayed within the first column 140 and each of the nodes of the tree data structure at a third level may be displayed within the second column 142.

In a particular illustrative embodiment, each displayable column in the column explorer display area 101 is displayed in a temporarily visible window or panel such that the user may navigate easily in a left to right manner and may view information that is relevant and in context while navigating and traversing the hierarchical data structure. In a particular example, a first displayable column represents data at a higher level in the tree data structure than data represented by a second displayable column and the second displayable column is displayable adjacent to (e.g. right of) the first displayable column. In this manner, the tree data structure is navigable in a left to right manner from a higher level node of the tree data structure to a lower level node of the tree data structure. Alternatively, the tree data structure may be navigable in a right to left manner based on a reading pattern or convenience of the user.

Upon selection of the second control item 104, a top down alternate view and navigation approach of the hierarchical data structure may be shown. For example, the top down view of a tree data structure may be illustrated and the top down tree data structure may be navigated in a top to bottom manner. Thus, the user interface shown in FIG. 1 may be navigated using a combination of a simple list within the navigation pane 100 combined with multiple panels as activated within the column explorer display area 101, or the hierarchical data structure may be navigated in a top down manner by selecting the second control item 104. Instead of a single list, the navigation pane 100 can include two levels of information where the second level is indented. The second level may be selectively displayed in the navigation pane 100 under developer control.

Figure 2:
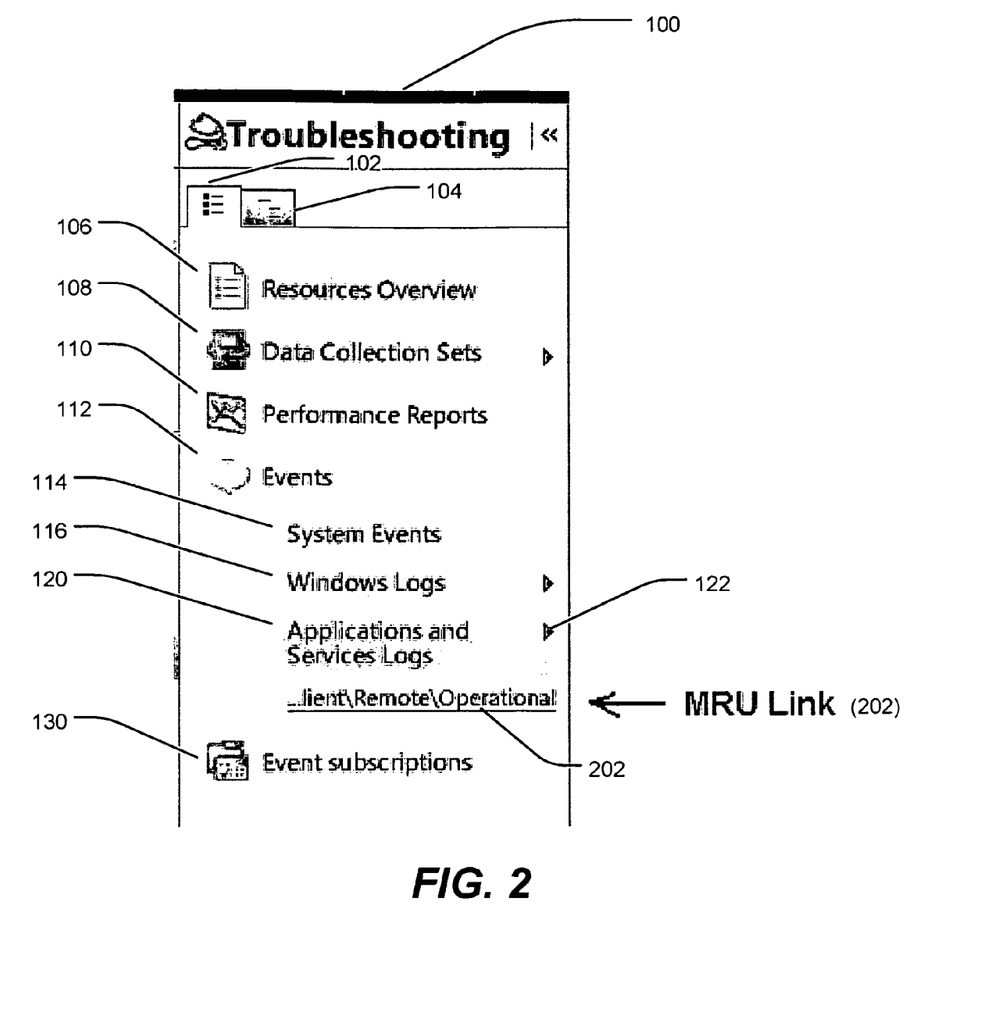
FIG. 2 is a general diagram that illustrates further details of a most recently used link displayed within a navigation pane of the user interface of FIG. 1.

Referring to FIG. 2, further details of the navigation pane 100 of the user interface of FIG. 1 is shown. The navigation pane 100 includes an area for displaying a most recently used (MRU) link 202. The most recently used link 202 provides a direct link to a particular item within the column explorer display area 101. The most recently used link 202 is representative of a particular item within the column explorer display area 101 that a user has previously selected or where the user has otherwise indicated an interest in use of the item. Upon user selection of the most recently used link 202, control is provided to immediately access the particular item without requiring further navigation by the user. In addition, by using the most recently used link 202, the last place a user navigated in the column explorer display area 101 can be automatically saved at the navigation pane 100 so that when a user subsequently selects the column display area, the user may start out where they left off the last time under the same navigation pane item. As such, the most recently used link 202 provides a convenient method of directly accessing and retaining contextual and historical user action information to provide convenient access and navigation control.

The most recently used link 202 may be created automatically when a user selects a particular item of the hierarchical namespace and after a delay period expires, when data is presented in a results viewing area and after expiration of a results viewing period of time, upon the user taking an action with respect to results data associated with a particular one of a list of items, or otherwise when the user takes an action related to the particular item. In the above example, the list of items could be an item selected from one of the entries within the first column 140, such as the selectable item 151 shown in FIG. 1. In another example, a selectable item may be deep within the hierarchical data structure, such as the operational item shown as MRU link 202 associated with the remote item within the fourth column 146 as shown in FIG. 1.

In a particular embodiment, the user interface as shown in FIG. 1 and FIG. 2 includes a navigation pane 100 having a plurality of selectable items where the navigation pane 100 is displayable in a first region of the display. The user interface further includes a column explorer display area 101 that is selectively displayable in a second region of the display where the second region is distinct from the first region. Further, a most recently used indicator associated with a particular one of the selectable items in the navigation pane 100 identifies a data item displayed in the column explorer display area 101. In a particular example, the most recently used data item corresponds to a particular one of a set of selectable items identified as having interest to the user through one of many techniques, such as direct selection, active use, or other indications of user interest. The column explorer display area 101 may include a plurality of expandable popup display regions that are temporarily visible and selectable by user action. In a particular example, the column explorer display area 101 is displayed in the second region upon selection of a particular icon, such as selection of the column explorer activation icon 122 associated with the applications and services logs icon 120, as shown in FIG. 1.

Figure 3:
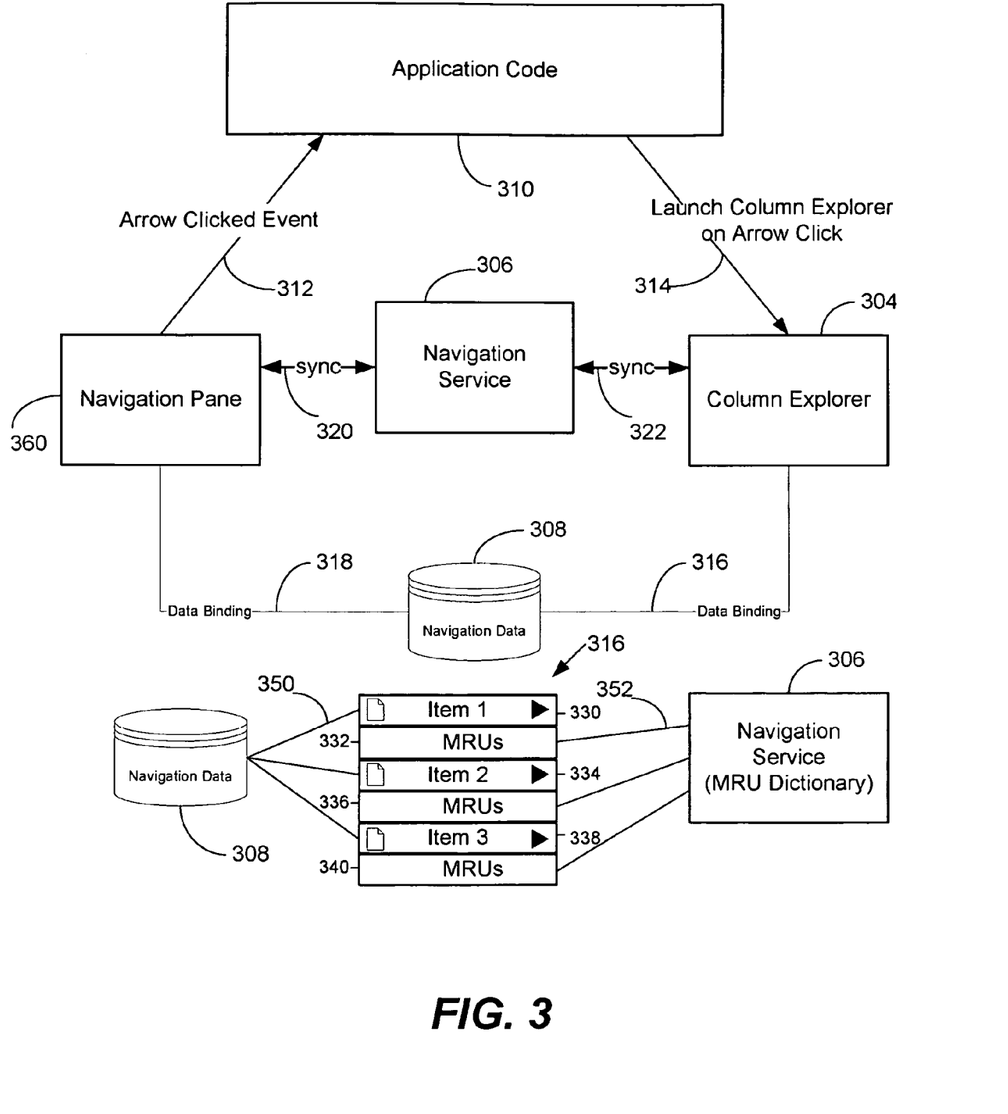
FIG. 3 is a block diagram that illustrates a particular embodiment of a system of providing a user interface having a navigation pane and a column explorer display area.

Referring to FIG. 3., a system to implement and support the navigable user interface as shown in FIG. 1 and FIG. 2 is illustrated. The system includes application code 310, navigation pane logic 360, column explorer logic 304, and navigation data storage 308. The system further includes a navigation service 306 that is synchronized to the navigation pane logic 360 via synchronization link 320 and is synchronized to the expandable column explorer logic 304 via synchronization link 322. The navigation pane logic 360 may be activated by an arrow click event 312 (e.g. using a computer mouse) to launch the application code 310. Upon selection of a selectable icon or through another mechanism, the application code 310 invokes launch of the column explorer 314 to activate the column explorer logic 304. Actions that involve the navigation pane logic 360 with respect to items within the column explorer logic 304 are synchronized using the synchronization links 320, 322, and the interfacing and inter-workings thereof are handled by the navigation service 306. The navigation data storage 308 stores data binding elements from the column explorer logic 304 and the navigation pane logic 360. For example, actions that involve the column explorer logic 304 may be stored via data bindings 316 into the navigation data storage 308. For example, a most recently used item is stored in the navigation data storage 308 and may be retrieved by the navigation pane logic 360 via data binding 318 to retrieve and display a direct link, such as the most recently used link 202 for display within the navigation pane area 100 of the interface, as shown in FIG. 2.

The navigation data storage 308 may include several items and their associated recently used link data, as shown in FIG. 3. For example, a first item 330 has a first associated most recently used link (MRU) 332, a second item 334 has a second most recently used link 336, and a third item 338 has a third most recently used link 340. The navigation data storage 308 is linkable to the various items and links through a data connector 350. Further, the navigation service 306 may include a most recently used dictionary and may retrieve the items 330, 334, 338 and the associated most recently used links 332, 336, 340 from the navigation data storage 308 via a data connector 352. Thus, the navigation service 306 provides an interworking function between actions by the navigation pane logic 360 and actions of the column explorer logic 304 for synchronized navigation control.

In a particular embodiment, the navigation pane logic 360 provides a navigation pane 100 for display as part of a user interface. The navigation pane 100 includes a plurality of displayable data items representing a first set of high level nodes of a hierarchical data structure, such as a tree data structure of a namespace. The expandable column explorer logic 304 may selectively present one or more columns within a second area of the user interface. The one or more columns are to display a second set of data items that represent portions of the hierarchical data structure. The second set of data items of the hierarchical data structure are selectively displayed by the one or more columns. A first of the one or more columns includes a first portion of the second set of data items and a second of the one or more columns includes a second portion of the second set of data items. The first portion identifies data items at a different level of the hierarchical data structure than the second portion. For example, a first column within the column explorer display area may represent nodes at a second level of a tree data structure, and a second column of the column explorer display area may represent nodes at a third level of the tree data structure.

Upon navigation to a data item displayed in one of the columns of the column explorer display area, a link to the data item may be added as a selectable most recently used link in association with one of the plurality of displayable data items in the navigation pane. In a particular illustrative embodiment, the system further includes a navigation service 306 that couples the most recently used data items displayed in one or more of the columns within the column explorer display area of a user interface to corresponding displayable data items in a navigation pane area. The navigation data may be bound to both the navigation pane and to the column explorer display area. In a particular example, the navigation data includes a record of a plurality of most recently used data items and the navigation data is identifiable by a most recently used link that is displayed within the navigation pane display region, such as the navigation pane 100 as shown in FIG. 1 and FIG. 2.

In a particular embodiment, when a new column is added to a column explorer display area by the column explorer logic 304, a new column is added to the right of the rightmost displayed column and a leftmost column that was previously displayed in a position adjacent to the navigation panel may no longer be displayed upon display of the new column. In an alternative embodiment, a new column may be added to the left of the leftmost displayed column based on a reading pattern or convenience of the user. In this manner, the column explorer logic 304 may present additional columns as the user navigates into deeper areas of the hierarchical namespace data structure. For example, referring to FIG. 1, the column explorer display area 101 may present a fifth column to the right of the displayed fourth column 146, and in this case, the first column 140 disappears from the display and each of the previously displayed columns move one spot to the left.

In addition, in a particular illustrative embodiment, a first link to a most recently used data item in a first column is displayed in a first location in the navigation pane that is associated with a first data item in the navigation pane. A second link to a second most recently used data item in a second column is displayed at a second location in the navigation pane associated with a second data item in the navigation pane. For example, referring to FIG. 1, a first item within the first column 140 may be displayed in an area associated with the applications and services logs icon 120, and a second item from the second column 142 may be displayed in a different area of the navigation pane 100. Thus, multiple most recently used links associated with various selectable items within the navigation pane 100 may be displayed and used for subsequent navigation.

The system and method for providing a user interface is useful for large scale hierarchical data structures, such as namespaces having a depth of five or greater and including hundreds or even thousands of nodes, such that multiple columns of the column explorer display area may be utilized efficiently. In addition, the namespace to be navigated may be associated with a Windows® operating system environment as a particular example. In addition, where multiple most recently used links are displayed, a maximum number of links may be displayed at a given time such that a new most recently used link may be displayed to replace an older link, such that the user interface remains current and shows recent user activity.

Figure 4:
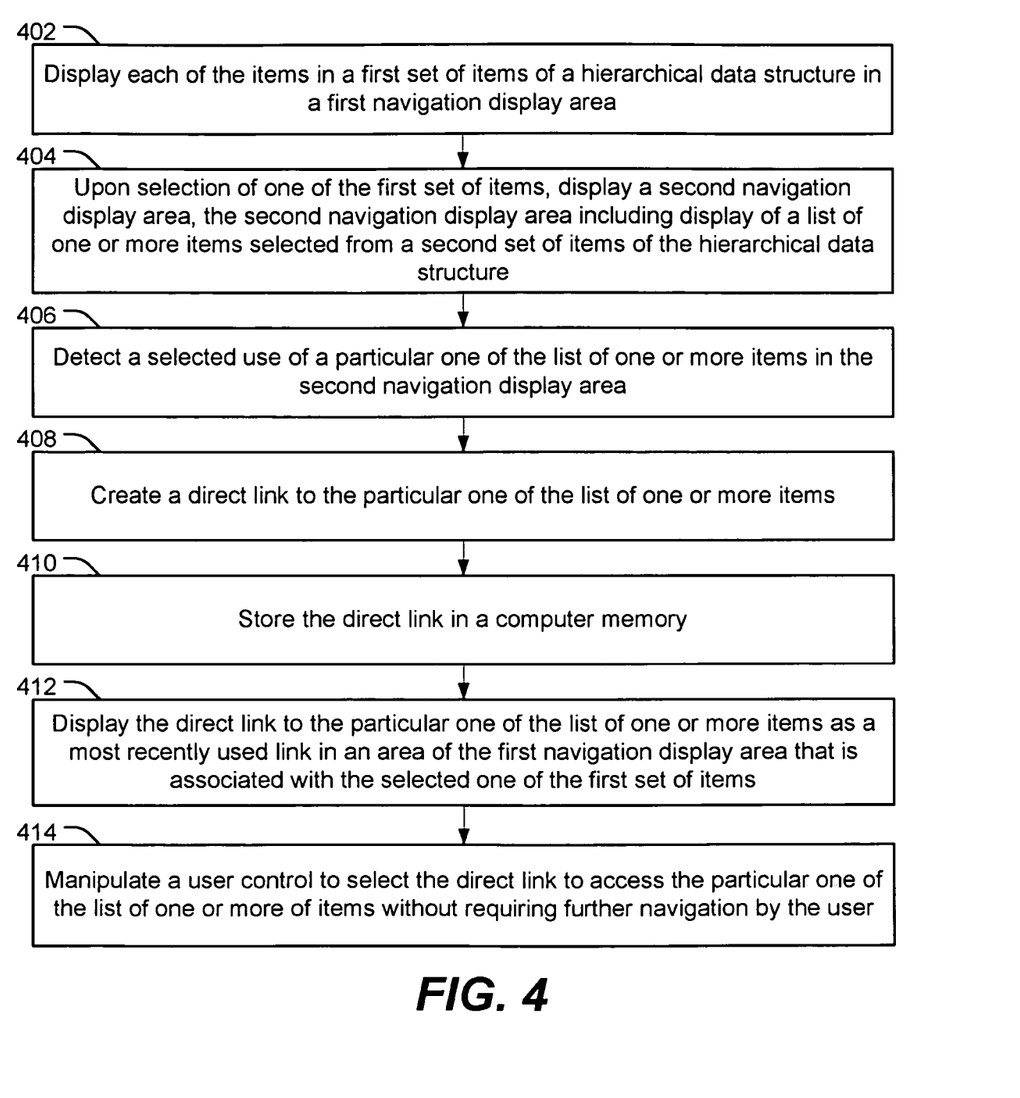
FIG. 4 is a flow chart that illustrates a method of providing the user interface of FIGS. 1 and 2.

Referring to FIG. 4, a method of displaying user interface information with respect to navigation of a hierarchical namespace is illustrated. In a particular example, the hierarchical namespace includes a first set of items representing a top level portion of the hierarchical namespace and a second set of items representing lower levels of the hierarchical namespace. The method includes displaying each of the items in the first set of items of the hierarchical data structure (e.g., namespace) in a first navigation display area, such as in the navigation pane 100 of FIG. 1, as shown at 402. The method further includes, upon selection of one of the first set of items, displaying a second navigation display area, as shown at 404. The second navigation display area includes display of a list of one or more items selected from a second set of items of the hierarchical namespace. The second set of items may be displayed in a column explorer display area 101 as shown in FIG. 1. The method further includes detecting a selected use of a particular one of the list of one or more items in the second navigation display area, at 406. For example, the user may select or indicate interest in an item within the column explorer display area 101 as shown in FIG. 1.

In a particular illustrative embodiment, the selected use of the particular one of the list of one or more items is detected automatically, such as when a user selects a node of the hierarchical namespace, after a delay period expires, when data is presented in a results viewing area and after expiration of a results viewing period of time, or upon a user taking an action with respect to results data associated with a particular one of the list of one or more items or otherwise taking an action related to the particular one of the list of one or more items. As an example, the action taken by the user may be indicated by a right mouse button selection or a user selected action from an actions pane area within the user interface.

In a particular illustrative example, a most recently used link may be added under the following conditions: when the user selects a leaf node of a tree data structure, a short cut to that node may be added; when there is data in a results view and the user stays on a selection for a set amount of time; if the user clicks in the results area, the user may be interested in the data contained in the results area so a short cut may be added; or if the user performs an action on a node either by a right click or from the action pane, a short cut may be added. While the above examples illustrate cases where a user may have an interest in returning to a particular node, it should be understood that the above examples are not limiting and other actions or algorithms may be used to indicate user interest and to provide display of the most recently used link.

In addition, the amount of time that a user stays on a particular selection may be determined based on usability studies that indicate the likelihood of user interest. In addition, a timer may be adjusted or may be configurable so that user interest may be more accurately predicted. As an illustrative example, a default timer may be set at a level of seven seconds. The timer may start when the user selects a node and may end when a user takes an action such as browsing to another location, selecting another node, performing an action at another node, or performing a triggering event on the current node or any other node.

Upon detecting user interest in a particular item, the method further includes creating a direct link to the particular one of the list of one or more items, at 408. For example, the direct link may be a most recently used link to a selected item within the column explorer display area. The method further includes storing the direct link in a computer memory, at 410. As an example, the direct link may be stored within the navigation storage 308 as shown in FIG. 3. The method further includes displaying the direct link to the particular one of the list of one or more items as a most recently used link in an area of the first navigation display area that is associated with the selected one of the first set of items, as shown at 412. For example, the most recently used link to a selected item within the column explorer display area 101 may be displayed within the fixed navigation pane 100, as shown in FIG. 2. The method further includes manipulating a user control to access the particular one of the list of one or more items, as shown at 414. For example, the user may select the most recently used link 202 to navigate to a direct connection to the previously used element within the column explorer display area 101. The selection of the direct link is performed without requiring further navigation by the user. In a particular embodiment, the user may manipulate a user control to access the particular one of the second set of items without requiring further navigation, such as by use of a selection via mouse control of a most recently used link displayed in the first navigation display area.

Figure 5:
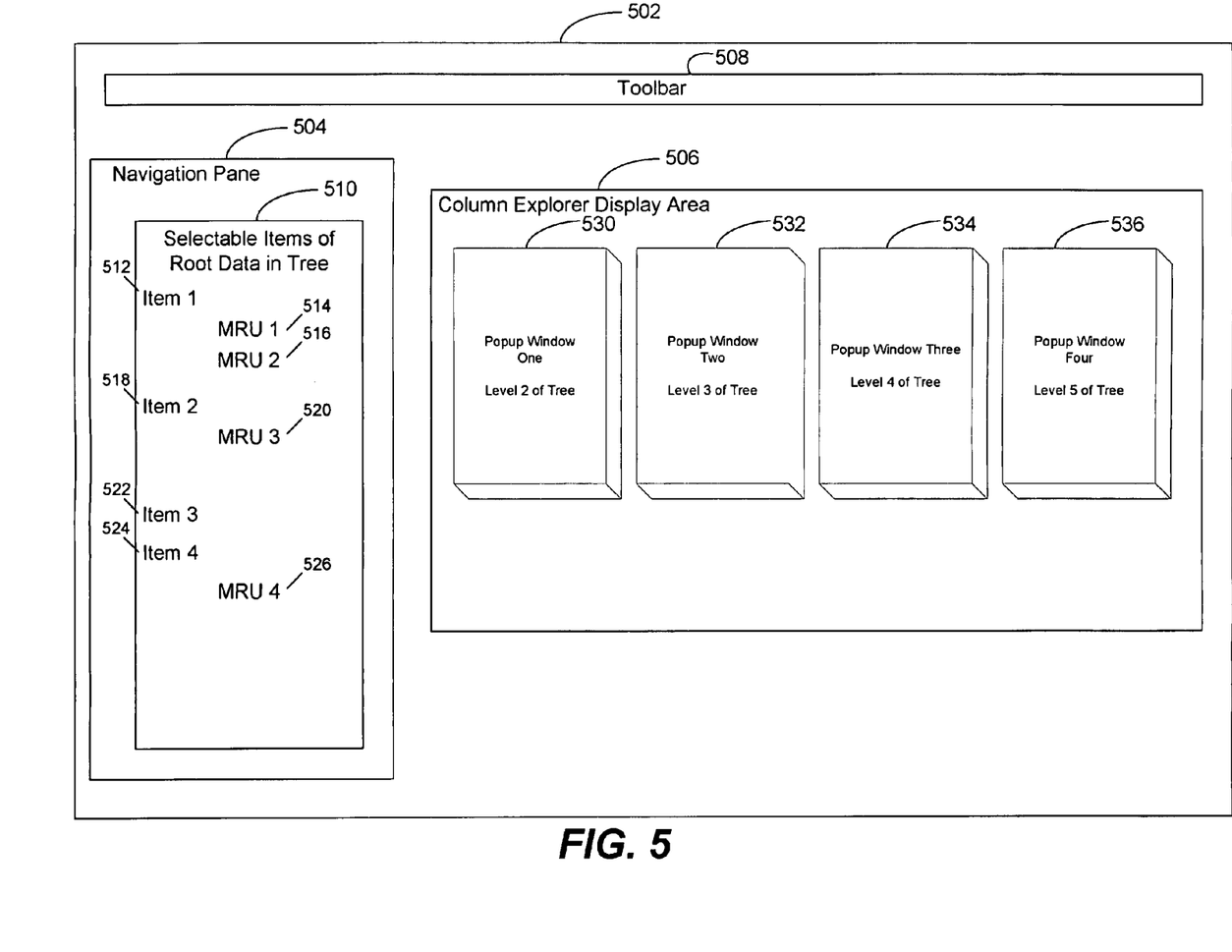
FIG. 5 is a general diagram that illustrates a particular embodiment of a user interface having a navigation pane and a column explorer display area.

Referring to FIG. 5, another illustrative embodiment of a user interface 502 having a navigation pane 504 and a column explorer display area 506 is shown. The user interface 502 includes a representative tool bar area 508. The navigation pane 504 includes selectable items of root data or high level data in a tree data structure 510. For example, the selectable items may include a first item 512, a second item 518, a third item 522, and a fourth item 524. Each of the selectable items 512, 518, 522, and 524 may include one or more most recently used (MRU) links. For example, the first item 512 includes a first most recently used link 514 and a second most recently used link 516. The second item 518 includes a third most recently used link 520, and the fourth item 524 includes a fourth most recently used link 526. Each of the most recently used links 514, 516, 520 and 526 allow a user direct access to an element within the column explorer display area 506 for subsequent action. The column explorer display area 506 includes a first column 530, a second column 532, a third column 534, and a fourth column 536. In a particular illustrative embodiment, each of the columns are represented as expandable popup display windows that are selectively displayed upon user activation.

In a particular example, the elements within the first column 530 represent data at a second level of a data tree structure, the elements within the second column 532 represent a third level of the data tree structure, and the elements within the third column 534 represent a fourth level of the data tree structure. Finally, the elements within the fourth column 536 represent a fifth level of the data tree structure. While only four columns are shown and only five levels of the data tree structure are described, it should be understood that multiple columns may be displayed and that tree data structures having more than five levels may be navigated by the user interface 502. For example, a fifth column may be added to the position occupied by the fourth column 536 and the fifth column (not shown) may represent a sixth level of the tree data structure. In this case, the first column 530 would be replaced by the second column 532 and each of the columns would move to the left in sequence so that the user could perform further navigation deeper within the tree data structure. Alternatively, when no further columns fit on the screen, a horizontal scroll bar may be displayed (not shown) and the user can scroll to view the different columns using the horizontal scroll bar.

Thus, the navigation pane 504 may be used to break down navigation to separate high level logical areas. Some items in the control area have deeper navigation elements below them and the user can browse such navigation elements using the column explorer control capabilities. The number of items in any given column of the column explorer display area 506 can be quite large. To deal with such large numbers of elements, each column has an input box that the user may type in to filter the items shown in the column. The combination of the navigation pane 504 and the column explorer display area 506 make finding an item for the first time in a complex and deep navigation structure easier.

In addition, users often need to return to places they have recently navigated to. When those places are deep within a data hierarchy, it may be cumbersome to navigate around the system. To address this situation, the disclosed system and method display the most recently used items in the navigation pane area 504. Whenever the user selects a node in the column explorer display area 506, a link to that location is saved in the left navigation pane 504 as illustrated in FIG. 5. Most recently used links are added to the navigation pane 504 in accordance with an algorithm designed to distinguish user selection from browsing. Each item in the column explorer display area 506 is selectable and may have a view associated with the item such that the user may return to such item. In other words, each item in the column explorer display area 506 is a candidate for a most recently used link.

The illustrations of the embodiments described herein are intended to provide a general understanding of the structure and use of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of displaying user interface information with respect to navigation of a hierarchical namespace, the hierarchical namespace including a first set of items representing a top level portion of the hierarchical namespace and a second set of items representing lower levels of the hierarchical namespace, the method comprising:
   displaying each of the items in the first set of items in a first navigation display area at a display device;
   displaying a second navigation display area at the display device, the second navigation display area including a column explore display area;
   detecting a selected use of a particular item in the second navigation display area;
   creating a direct link to the particular item; and
   displaying the direct link to the particular item in a link area of the first navigation display area at the display device, the link area associated with the selected one of the first set of items;
   wherein a first link to a most recently used data item in a first column of the column explorer display area is displayed in a first location in the first navigation display area, the first link associated with a first data item in the first navigation display area, and a second link to a second most recently used data item in a second column of the column explorer display area is displayed at a second location in the first navigation display area, the second link associated with a second data item in the first navigation display area.

2. The method of claim 1, further comprising manipulating a user control to access the particular item without requiring further navigation upon selection of the direct link in the first navigation display area.

3. The method of claim 1, wherein the selected use of the particular item is detected when a user selects an end node of the hierarchical namespace and after a delay period expires, when data is presented in a results viewing area and after expiration of a results viewing period of time, when the user takes an action with respect to results data associated with the particular item, or when the user takes an action related to the particular item.

4. The method of claim 1, wherein a location of the particular item of the list of one or more items in the second navigation display area is stored in a computer memory and wherein the particular item is immediately useable upon selection of the direct link, such that the direct link provides a shortcut to access the particular item.

5. A user interface comprising:
   a navigation pane including a plurality of selectable items, the navigation pane displayable in a first region of a display at a display device; and
   a column explorer display area selectively displayable in a second region of the display at the display device, the second region distinct from the first region;
   wherein a first link to a most recently used data item in a first column of the column explorer display area is displayed in a first location in the navigation pane, the first link associated with a first data item in the navigation pane, and a second link to a second most recently used data item in a second column of the column explorer display area is displayed at a second location in the navigation pane, the second link associated with a second data item in the navigation pane.

6. The user interface of claim 5, wherein the navigation pane includes a first control item to select a first tree data structure display and a second control item to select a second tree data structure display, wherein either the first tree data structure display or the second tree data structure display is visible; wherein the first tree data structure display presents hierarchical data of a tree data structure with respect to a column display orientation and the second tree data structure display presents the hierarchical data of the tree data structure with respect to a top-down orientation.

7. A system comprising:
   navigation pane logic to provide a navigation pane as part of a user interface at a display device, the navigation pane including a plurality of displayable data items representing a first set of high level nodes of a hierarchical data structure;
   expandable column explorer logic to selectively present a column explorer display area that includes one or more columns in response to selection of a column explorer activation selector within the navigation pane, the one or more columns to display a second set of data items representing portions of the hierarchical data structure distinct from the first set of high level nodes where the second set of data items of the hierarchical data structure are selectively displayed by the one or more columns, wherein a first of the one or more columns includes a first portion of the second set of data items and a second of the one or more columns includes a second portion of the second set of data items, wherein the first portion identifies data items at a different level of the hierarchical data structure than the second portion; and
   logic to display a first link to a most recently used data item in a first column of the column explorer display area in a first location in the navigation pane, the first link associated with a first data item in the navigation pane, and to display a second link to a second most recently used data item in a second column of the column explorer display area at a second location in the navigation pane, the second link associated with a second data item in the navigation pane.

8. The system of claim 7, further comprising a navigation service to couple data items displayed in the one or more columns within the column explorer display area of the user interface at the display device to corresponding displayable data items in the navigation pane.

9. The system of claim 8, further comprising navigation data that is bound to both the navigation pane and to the column explorer display area, the navigation data including a record of a plurality of most recently used data items, wherein each of the most recently used data items is identifiable by a corresponding link that is displayed within the navigation pane.

10. The system of claim 7, wherein the navigation pane further includes a second plurality of displayable data items representing a second set of nodes of the hierarchical data structure, wherein the navigation pane includes multiple levels of information where a second level of the multiple levels is indented with respect to a first level of the multiple levels, wherein the first level includes the plurality of displayable data items, and wherein the second level includes the second plurality of displayable data items representing the second set of nodes.

11. The system of claim 7, wherein a first link to a data item in a first column is displayed in a first location in the navigation pane associated with a first data item in the navigation pane and a second link to a second data item in a second column is displayed in a second location in the navigation pane associated with a second data item in the navigation pane.

12. The system of claim 7, wherein each of the one or more columns is adapted to enable a search of data items at a particular level of the hierarchical data structure.

13. The system of claim 7, wherein the navigation pane displays a selector that includes a plurality of subset selectors including at least one subset selector displayed proximate to the column explorer activation selector, and wherein the column explorer activation selector is proximate to the column explorer display area.

14. The system of claim 7, wherein the navigation pane includes an area for displaying a most recently used link, the most recently used link providing a direct link to a particular item within the column explorer display area, wherein the most recently used link is representative of the particular item within the column explorer display area that a user has most recently selected.

15. The system of claim 14, wherein the most recently used link is created automatically when a user selects the particular item of the hierarchical namespace and after a delay period expires.

16. The system of claim 7, wherein upon selection of the column explorer activation selector, application code invokes launch of the expandable column explorer logic, wherein actions that involve the navigation pane logic with respect to items within the expandable column explorer logic are synchronized using synchronization links, and wherein a navigation data storage stores data binding elements related to the expandable column explorer logic and the navigation pane logic.

17. The system of claim 16, wherein a most recently used item is stored in the navigation data storage and is retrievable by the navigation pane logic via a data binding to display a most recently used direct link within the navigation pane area, wherein the navigation data storage includes several items and associated recently used links.

18. The system of claim 7, wherein upon navigation to a data item in the one or more columns, a link to the data item is automatically added as a selectable link in association with one of the plurality of displayable data items in the navigation pane.

19. The system of claim 7, wherein a first of multiple selectable items in the navigation pane is associated with a first most recently used link and a second of the multiple selectable items in the navigation pane is associated with multiple most recently used links.

20. The method of claim 1, wherein a new most recently used link is displayed in the link area to replace the direct link previously displayed in the link area.

* * * * *